Oct. 27, 1942.  E. C. GWALTNEY  2,300,285
VARIABLE SPEED DRIVING MECHANISM
Filed Aug. 16, 1940

Inventor:
Eugene C. Gwaltney,
by J. H. McCready,
Attorney.

Patented Oct. 27, 1942

2,300,285

UNITED STATES PATENT OFFICE 2,300,285

VARIABLE SPEED DRIVING MECHANISM

Eugene C. Gwaltney, Biddeford, Maine, assignor to Saco-Lowell Shops, Boston, Mass., a corporation of Maine Application August 16, 1940, Serial No. 352,903

5 Claims. (Cl. 74—242.3)

This invention relates to variable speed mechanisms of the so-called "cone drive" type.

Such mechanisms are well known and have long been in use. In general, they operate very satisfactorily except when close adjustments of speed are required. Then they do give considerable trouble. Much of this difficulty is due to lost motion and to the failure of the belt to move promptly in response to adjusting movements of the controlling element therefor.

The present invention is especially concerned with these considerations and it aims to devise a simple and thoroughly practical solution for the problem presented by them.

The nature of the invention will be readily understood from the following description when read in connection with the accompanying drawing, and the novel features will be particularly pointed out in the appended claims.

Figure 2:
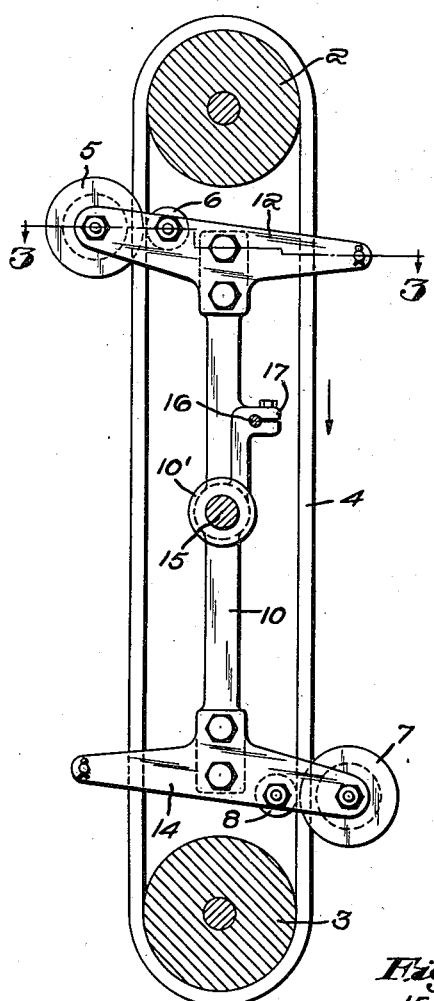
Fig. 2 is a vertical, sectional view of the mechanism illustrated in Fig. 1.
Figure 1:
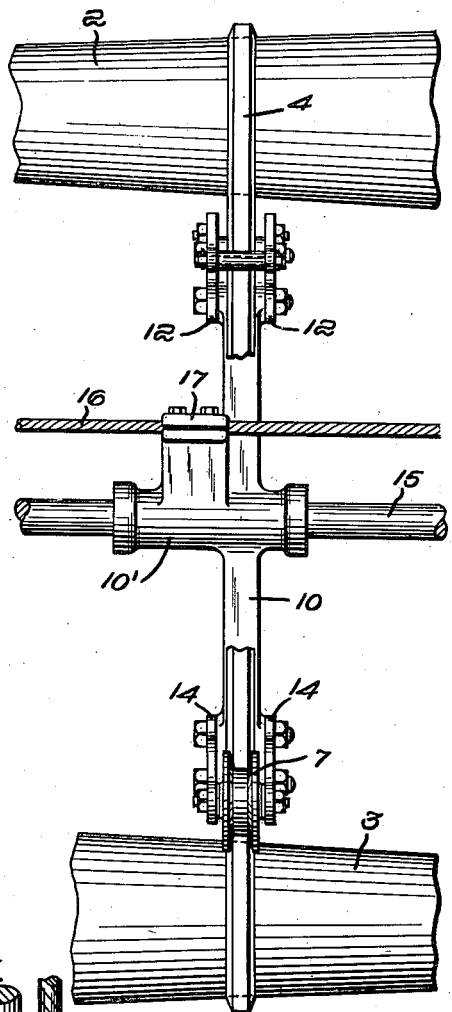
Figure 1 is a side elevation of a variable speed drive constructed in accordance with this invention.

The construction shown in the drawing comprises upper and lower pulleys 2 and 3, respectively, each of approximately frusto-conical form and the two pulleys being reversely positioned with reference to each other. These pulleys may be supported in any usual or convenient manner. In this connection it may also be pointed out that the pulleys frequently are not of true frusto-conical shape but that their belt engaging surfaces sometimes are modified, either by being slightly convexed or concaved or shaped in some other manner designed to improve their operation under particular conditions. So far as this invention is concerned, however, these variations in contour of the pulleys is immaterial.

Encircling the two pulleys is a belt 4 for driving one of them from the other. This belt is made exceptionally narrow, relatively thick, and preferably is tapered in cross-sectional form so that it is considerably wider at one edge than at the other. The wider edge runs in contact with both cones. Such a belt responds more readily to changes in adjustment lengthwise of the cones and it lends itself to use with adjusting mechanism which will control its position very accurately. For this purpose the belt shifting or adjusting mechanism shown comprises one or more sets of rolls for engaging the belt on three sides and exerting a rolling grip on it.

Figure 3:
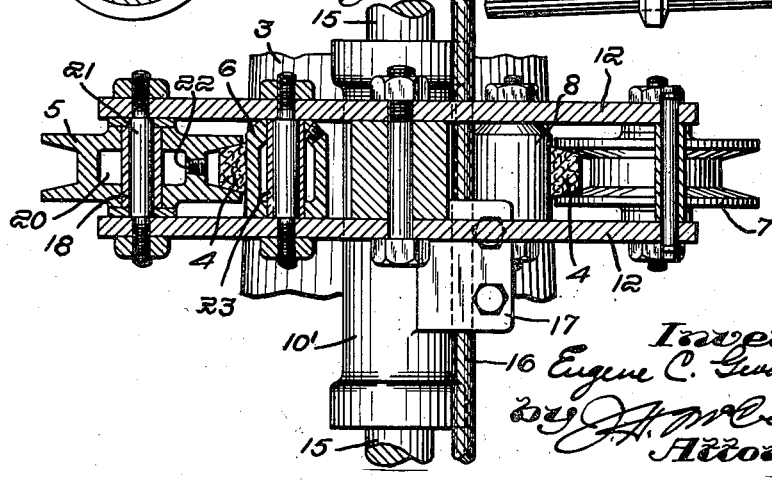
Fig. 3 is a horizontal, sectional view approximately on the line 3—3, Fig. 2, but on a somewhat larger scale than Fig. 2.

Referring to Figs. 2 and 3 it will be observed that the upper set of these devices includes a roll 5, circumferentially grooved to fit approximately the cross-sectional form of the belt 4 and adapted to receive a considerable part of the belt within the groove. Cooperating with it is a pressure roll 6 positioned directly opposite the first roll, where it holds the belt in the groove of the latter roll. Preferably a similar pair of rolls 7 and 8, respectively, is provided at the opposite side of the frame to engage the belt adjacent to the lower pulley 3.

Both sets of rolls are mounted on a frame comprising a bracket 10 and a pair of spaced flat supporting arms 12 at its upper end, these arms being secured together by bolts and spacers and by the stationary axles of the two rolls 5 and 6. The same construction is used at the lower end of the frame for supporting the rolls 7 and 8, the flat plate-like arms being shown in the drawing at 14.

Any suitable mechanism may be provided for giving the belt adjusting device its operating or adjusting movement. Frequently a gear and rack are used for this purpose. In the present arrangement, however, the bracket 10 is provided with an enlarged and elongated boss 10' which is drilled, reamed and bushed, if desired, to run on a stationary supporting rod 15. A cable 16 is secured to this member by means of a clamp 17 and is arranged to be operated in any suitable manner to move the bracket forward or backward. Any other adjusting means may be substituted, however, for the arrangement using the cable.

While the bearings for the belt engaging and guiding rolls 5, 6, 7 and 8 may be of any suitable form, self-oiling rolls, such as those illustrated at 5 and 6 in Fig. 3, have proved very satisfactory. As there shown the roll 5 has a bushing 18 pressed into it, this bushing being made of a porous bearing metal, such for example, as Oilite, and the roll itself has a central chamber 20 therein adapted to hold a substantial body of oil. This oil is fed slowly by the capillarity of the porous bushing 18 to the inner surface thereof where it lubricates the axle 21, and it also supplies lubricant to the washers which center the roll at opposite ends of the bushing. A plug 22, threaded radially through the outer wall of the chamber 21, provides for the convenient replenishment of the oil supply. The roll 6 is of essentially the same construction, the porous bushing therefor being shown at 23.

It should be observed that in this arrangement the belt is constantly held in the grip of the two sets of rolls 5 and 6 and 7 and 8, respectively. Since these rolls revolve freely, the fact that they grip the belt does not impede the movement of travel of the latter. But such an engagement with the belt close to the two points at which it runs on to the respective cones, means that the belt is compelled to follow accurately every movement of the controlling element. Consequently, lost motion between this element and the belt is eliminated. Thus the belt adjustments can be made very accurately and consequently, the speed changes will be controlled with equal accuracy. As a result the tendency of the belt to run first on one side of the shifter and then on the other, which has been a source of annoyance with prior constructions, is avoided, and the speed changes which take place during such shifts and independently of the movement of the controlling element likewise are avoided.

These are important considerations in many machines as, for example, in such textile machines as roving frames. In such a machine, a change in speed is required with each layer of roving added to the bobbin and it is important that such change be made promptly and to exactly the desired degree in order to keep the winding speed constant and to maintain the tension uniform on the strands of roving. This is readily accomplished with the mechanism above described.

In this connection it may be pointed out that the narrow belt is useful in facilitating adjustment of the belt to obtain small and gradual changes in speed. Also, that the tapered cross-sectional form of the belt reduces the volume of material which must constantly undergo changes in compression or tension as the belt bends in travelling around the pulleys. At the same time this mechanism takes full advantage of the larger driving area of the belt at its wider edge.

While I have herein shown and described a preferred embodiment of my invention, it will be understood that the invention may be embodied in other forms without departing from the spirit or scope thereof.

Having thus described my invention, what I desire to claim as new is:

1. A variable speed drive, comprising two pulleys, each of approximately frusto-conical form, reversely positioned with reference to each other, a belt connecting them to drive one from the other, said belt being wider at one edge than at the other, the wider edge of said belt running in contact with both cones, and means for adjusting said belt lengthwise of said pulleys, comprising a roll grooved to approximately fit the cross-sectional form of the belt, and means supporting said roll for said adjusting movement.

2. A variable speed drive, comprising two pulleys, each of approximately frusto-conical form, reversely positioned with reference to each other, a belt connecting them to drive one from the other, said belt being of tapered cross-sectional form and consequently wider at one edge than at the other, the wider edge of said belt running in contact with both cones, and means for adjusting said belt lengthwise of said pulleys, comprising a roll grooved to approximately fit the cross-sectional form of the belt, an opposing roll pressing said belt into the groove of the other roll, and means supporting said rolls for said adjusting movement.

3. A variable speed drive, comprising two pulleys, each of approximately frusto-conical form, reversely positioned with reference to each other, a belt connecting them to drive one from the other, said belt being relatively narrow and thick, a belt adjusting device comprising a frame, a set of rolls mounted on said frame and comprising a roll circumferentially grooved to admit said belt and a pressure roll holding said belt in the groove of the other roll, and means supporting said device for its belt adjusting movement.

4. A variable speed drive, comprising two pulleys, each of approximately frusto-conical form, reversely positioned with reference to each other, a belt connecting them to drive one from the other, said belt being wider at one edge than at the other, the wider edge of said belt running in contact with both cones, and a belt adjusting device comprising a frame and two sets of rolls mounted on said frame and positioned to engage said belt at widely spaced points adjacent to the two pulleys, each of said sets of rolls including one roll grooved to approximately fit the cross-sectional form of the belt and a pressure roll holding said belt in the groove of the other roll, and means supporting said device for its belt adjusting movement.

5. A variable speed drive, comprising two pulleys, each of approximately frusto-conical form, reversely positioned with reference to each other, a belt connecting them to drive one from the other, said belt being relatively narrow and thick and wider at one edge than the other, and means for adjusting said belt lengthwise of the pulleys comprising a plurality of rolls simultaneously engaging the surfaces on three sides of the same transverse cross-sectional portion of said belt and thereby cooperating to exert a rolling grip on the belt as the belt travels between the pulleys.

EUGENE C. GWALTNEY.